(12) United States Patent
Wu

(10) Patent No.: US 8,145,280 B2
(45) Date of Patent: Mar. 27, 2012

(54) PORTABLE ELECTRONIC DEVICE

(75) Inventor: Zai-Jun Wu, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 423 days.

(21) Appl. No.: 12/488,727

(22) Filed: Jun. 22, 2009

(65) Prior Publication Data

US 2010/0160006 A1  Jun. 24, 2010

(30) Foreign Application Priority Data

Dec. 22, 2008  (CN) .......................... 2008 1 0306412

(51) Int. Cl.
*H04B 1/38* (2006.01)
(52) U.S. Cl. ............... 455/575.1; 454/575.3; 454/550.1; 361/600; D14/345
(58) Field of Classification Search .............. 345/169; 361/600, 625, 679.01–679.09, 679.2, 679.21–679.29, 361/679.3, 679.31–679.39, 679.4, 679.41–679.44; 455/550.1, 552.1, 553.1, 556.1, 556.2, 575.1–575.7, 455/90.3, 342, 344, 346–350
See application file for complete search history.

(56) References Cited

U.S. PATENT DOCUMENTS

| | | | |
|---|---|---|---|
| 6,746,770 B1 * | 6/2004 | Afzali-Ardakani et al. ................. | 428/411.1 |
| 7,499,074 B2 * | 3/2009 | Kim et al. ................. | 348/14.02 |
| 7,512,397 B2 * | 3/2009 | Liu et al. ................. | 455/347 |
| 7,832,058 B2 * | 11/2010 | Wang et al. ................. | 16/367 |
| 7,966,698 B2 * | 6/2011 | Barnett ................. | 16/367 |
| 2003/0083599 A1 * | 5/2003 | Kitov ................. | 601/84 |
| 2004/0224729 A1 * | 11/2004 | Watanabe et al. ................. | 455/575.3 |
| 2006/0023411 A1 * | 2/2006 | Ryu et al. ................. | 361/683 |
| 2006/0068329 A1 * | 3/2006 | Aylward et al. ................. | 430/311 |
| 2006/0094483 A1 * | 5/2006 | Jung ................. | 455/575.3 |
| 2006/0160585 A1 * | 7/2006 | Miyagawa et al. ................. | 455/575.7 |
| 2006/0187625 A1 * | 8/2006 | Jung et al. ................. | 361/681 |
| 2007/0133981 A1 * | 6/2007 | Tsuji ................. | 396/448 |
| 2010/0254076 A1 * | 10/2010 | Hasegawa et al. ................. | 361/679.01 |

* cited by examiner

*Primary Examiner* — Kent Chang
*Assistant Examiner* — Magdi Elhag
(74) *Attorney, Agent, or Firm* — Altis Law Group, Inc.

(57) ABSTRACT

A portable electronic device includes a cover, a main body rotatably connecting to the cover, and a bracket received in the cover. The bracket includes a holding member and a connecting member extending from the holding member. The holding member is used for holding the lens. The connecting member includes a buffer mounted between a joint section of the cover and the main body. The buffer can slow down the abrasion between the cover and the main body.

13 Claims, 5 Drawing Sheets

PORTABLE ELECTRONIC DEVICE

BACKGROUND

1. Technical Field

The present disclosure generally relates to electronic devices, particularly, to a portable electronic device with a bracket for holding a lens.

2. Description of Related Art

A typical mobile phone often includes a body, a lens held in the body and a bracket holding the lens. The bracket forms a plurality of protrusions, and the lens defines at least one locking slot to engage with the protrusions of the bracket, so that the lens can be held without glue and avoid being polluted by the glue. However, such bracket can only hold the lens, and cannot performs other functions. Thus, other components need to be employed to perform correspondingly functions. For example, to avoid electromagnetic interference, an electromagnetic shielding member is needed in the mobile phone, and a holding device to hold the electromagnetic shielding member. Therefore, more space is occupied. If the mobile phone is a foldable phone, a buffer is often needed between the joint section of a cover and a main body to reduce the friction between the cover and the main body.

Under normal circumstances, these components are separately formed and required a specific holding device to hold each component correspondingly. Therefore, the assembly process is complicated.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout several views, and all the views are schematic.

DETAILED DESCRIPTION

Figure 1:
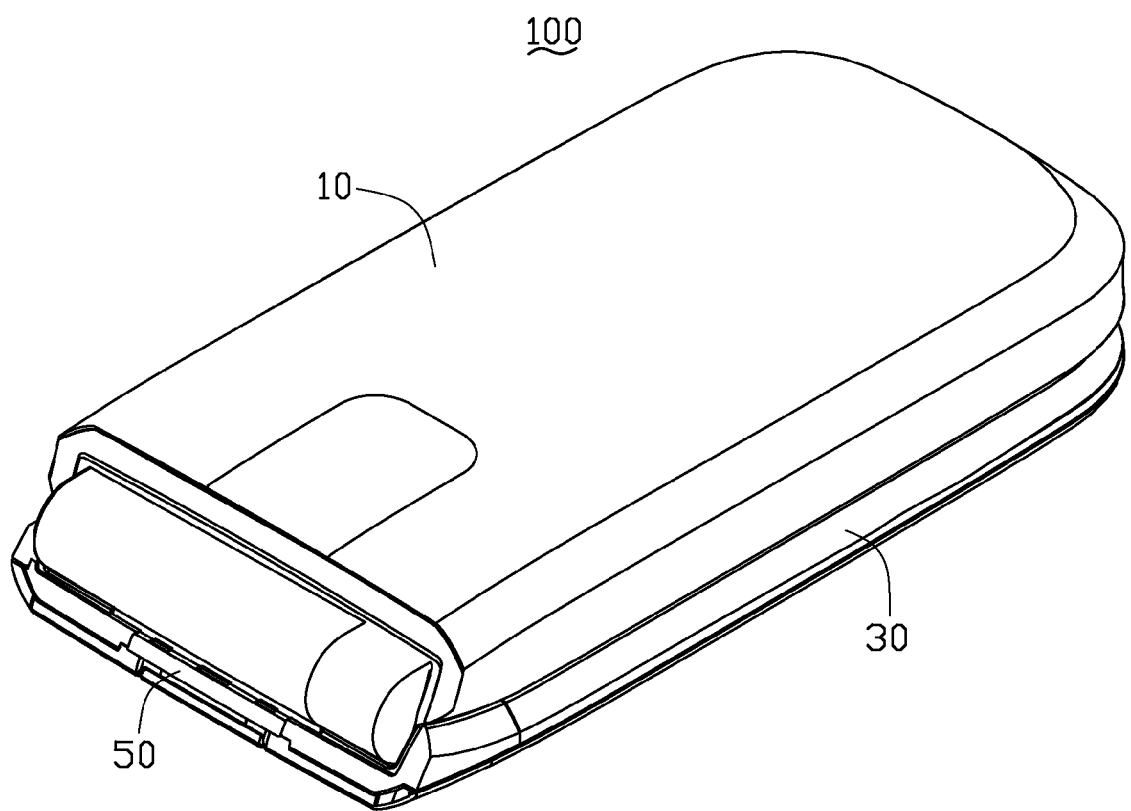
FIG. 1 is an assembled, isometric view of an embodiment of an electronic device.

The present electronic device may be portable electronic devices, such as mobile phones, notebooks, etc. Referring to FIG. 1, an embodiment of the portable electronic device is described and illustrated with reference to a mobile phone 100.

Referring to FIG. 1, the mobile phone 100 includes a cover 10, a main body 30 rotatably connected to the cover 10, and a bracket 50 mounted in the cover 10.

Figure 2:
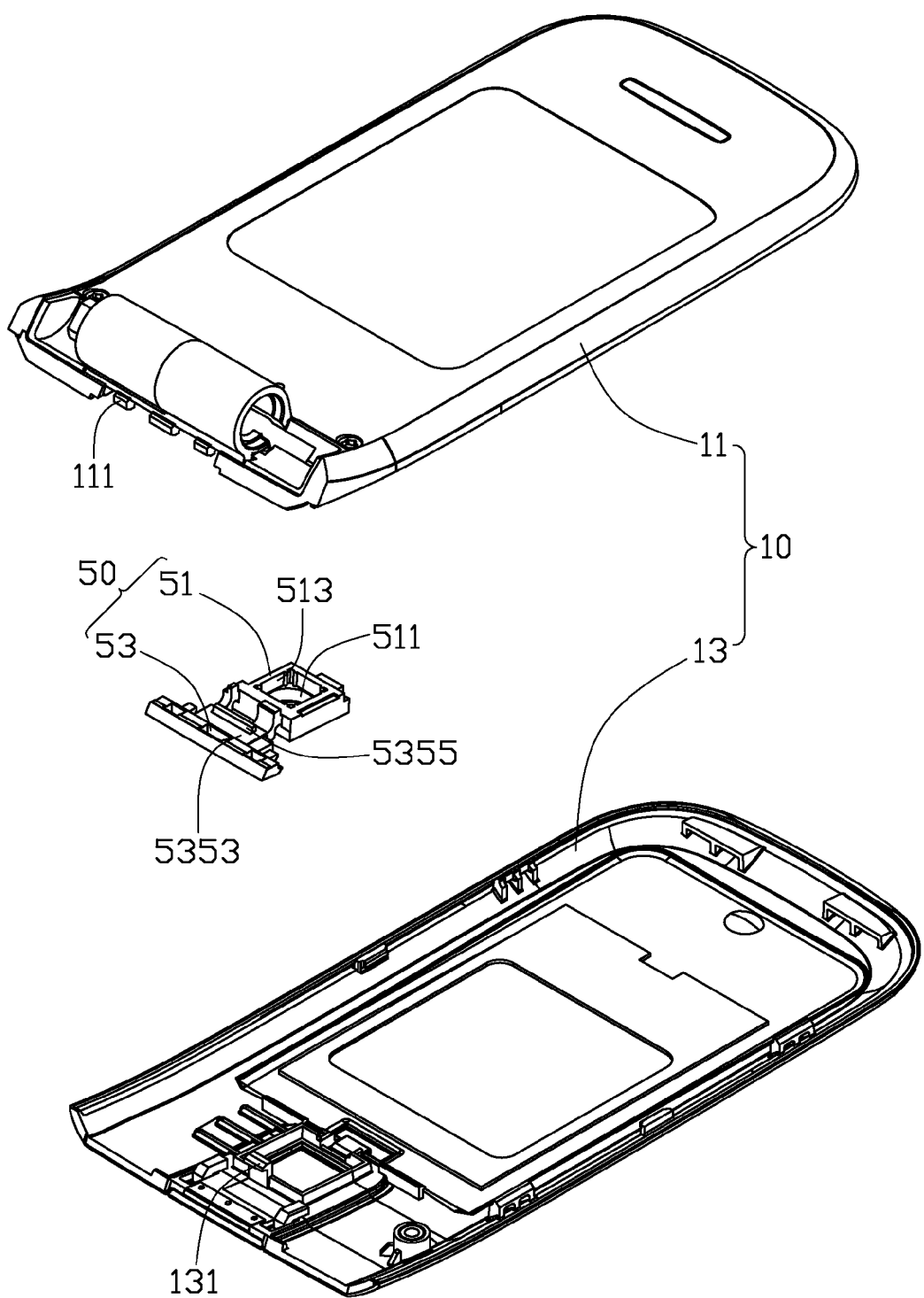
FIG. 2 is an exploded, isometric view of the part of a cover of the electronic device of FIG. 1.
Figure 3:
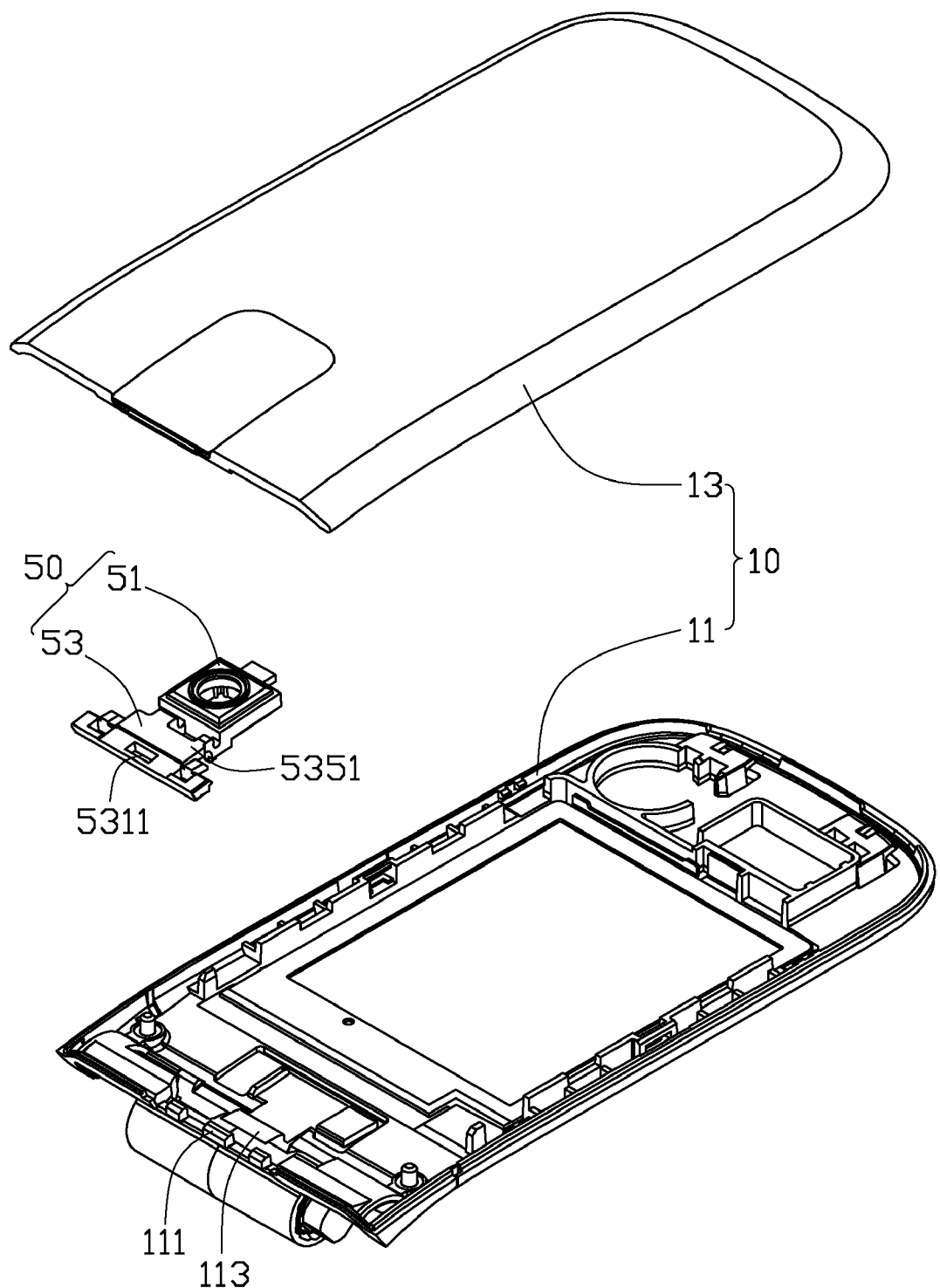
FIG. 3 is an exploded, isometric view of the cover of the electronic device of FIG. 1, viewed from another aspect.

Referring to FIG. 2 and FIG. 3, the cover 10 includes an upper shell 11 and a lower shell 13 engaged with the upper shell 11. A receiving space (not labeled) is defined between the upper shell 11 and the lower shell 13.

Figure 5:
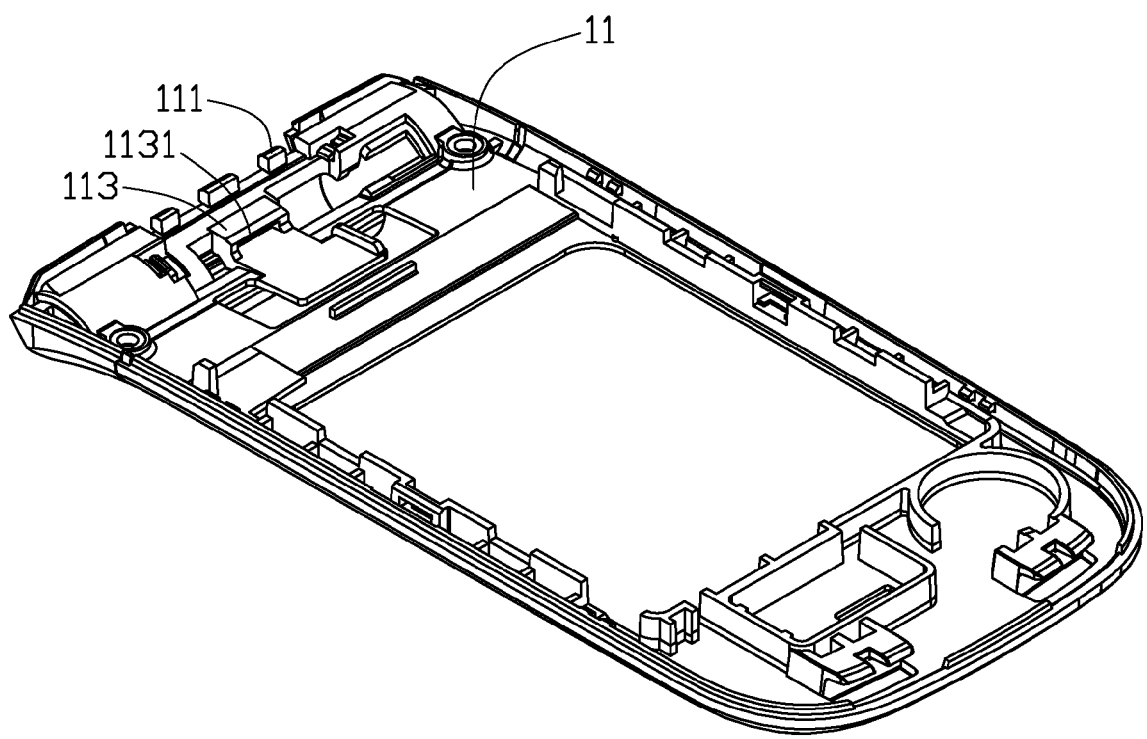
FIG. 5 is an isometric view of an upper shell of the electronic device of FIG. 1.

The joint section of the upper shell 11 and the lower shell 13 forms at least one restricting portion 111. In the illustrated embodiment, there are three restricting portions 111 arranged along a line at the edge of the upper shell 11. The upper shell 11 forms a positioning protrusion 113 near the restricting portion 111, and a locking slot 1131 (shown in FIG. 5) is defined in the positioning protrusion 113. The lower shell 13 forms a hook 131 to hold the bracket 50.

Figure 4:
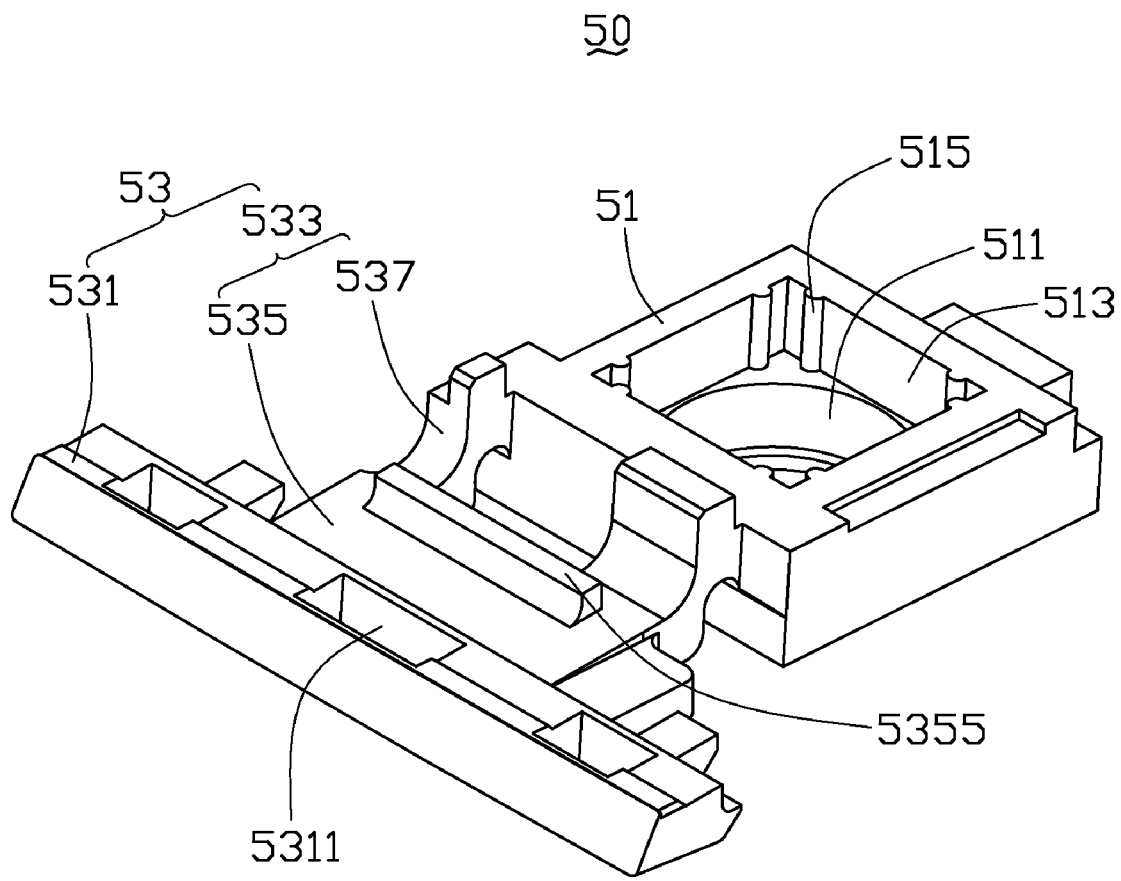
FIG. 4 is an isometric view of a bracket of the electronic device of FIG. 1.

Referring to FIG. 2 to FIG. 4, the bracket 50 includes a holding member 51 and a connecting member 53 connecting to the holding member 51. The holding member 51 and the connecting member 53 may be made of plastic material and integrally formed, in the illustrated embodiment, the holding member 51 and the connecting member 53 are made of thermoplastic polyurethanes (TPU).

The holding member 51 defines a mounting hole 511 and a holding slot 513 communicating with the mounting hole 511. The mounting hole 511 is used for receiving a lens (not shown) therein. The inner sidewall of the holding slot 513 forms a plurality of protrusions 515, and the protrusions 515 are made of elastic material, therefore, the lens may be held with the protrusions 515 and held in the holding slot 513.

The connecting member 53 includes a buffer 531 and a connecting portion 533 for connecting the buffer 531 and the holding member 51. The surface of the buffer 531 is coated with conductive material. The buffer 531 defines at least one restricting hole 5311. In the illustrated embodiment, there are three restricting holes 5311 arranged along a line in the buffer 531. The restricting holes 5311 are engaged with the restricting portions 111 correspondingly. The connecting portion 533 includes a base plate 535 connecting with the buffer 531 and two connecting arms 537 extending from one side of the base plate 535 to the sidewall of the holding member 51. The base plate 535 includes a shielding surface 5351 coated with conductive material and a positioning surface 5353 opposite to the shielding surface 5351. A positioning strip 5355 engaging with the locking portion 131 of the lower shell 13 protrudes from the positioning surface 5353.

When the bracket 50 is positioned in the cover 10, the restricting portions 111 of the upper shell 11 extend through the restricting holes 5311 of the buffer 531 correspondingly. The locking portion 131 of the lower shell 13 extends through a slot between the connecting arms 537 of the connecting portion 533 and resists the positioning strip 5355 of the base plate 535. The locking portion 131 engages with the locking slot 1131 of the upper shell 11, so that the bracket 50 is held in the cover 10, and the buffer 531 is located the joint section of the cover 10 and the main body 30, part of the buffer 531 is exposed outside of the cover 10.

The holding member 51 can hold the lens. When the cover 10 is rotating relative to the main body 30, the buffer 531 of the connecting member 53 contacts with the main body 30, so that there is no directly contacting between the cover 10 and the main body 30. Therefore, there is little abrasion of the main body 30 and the cover 10. The buffer 531 has a conductive surface, and the shielding surface 5351 of the base plate 535 is also a conductive surface, so the static electricity in the mobile phone 100 can be released by the buffer 531 and the shielding surface 5351 of the base plate 535. Therefore, the bracket 50 has various functions. In addition, the holding member 51 and the connecting member 53 are integrally formed, so that there is only need to hold the bracket 50, the assemble process is relative simple.

In alternative embodiments, the connecting portion 533 may be omitted, the buffer 531 may connect with the holding member 51 directly. The buffer 531 and the holding member 51 may be integrally formed.

Finally, while various embodiments have been described and illustrated, the disclosure is not to be construed as being limited thereto. Various modifications can be made to the embodiments by those skilled in the art without departing from the true spirit and scope of the disclosure as defined by the appended claims.

What is claimed is:

1. A portable electronic device, comprising:
   a cover comprising an upper shell;
   a main body rotatably connecting to the cover;
   a bracket comprising a holding member for holding lens and a connecting member connecting to the holding member, the holding member defining a holding slot, the holding slot having an inner sidewall, the inner sidewall forming at least one protrusion; and
   at least one restricting portion protruding from the edge of the upper shell;
   wherein the surface of the connecting member is coated with conductive material, the connecting member comprises a buffer mounted at the joint section of the cover and the main body, reducing abrasion of the cover and the main body, the buffer defines at least one restricting hole receiving the at least one restricting portion.

2. The portable electronic device of claim 1, wherein the connecting member further comprises a connecting portion arranged between the holding member and the buffer.

3. The portable electronic device of claim 1, wherein the cover further comprises a lower shell; the connecting portion comprises a base plate connecting with the buffer; the base plate forms a positioning strip; the lower shell forms a locking portion engaging with the positioning strip.

4. The portable electronic device of claim 3, wherein the connecting portion further comprises two connecting arms extending from the base plate to the holding member; the locking portion of the lower shell extends through between the connecting arms.

5. The portable electronic device of claim 1, comprising three restricting portions and three restricting holes of the buffer, in which the three restricting portions are respectively received.

6. The portable electronic device of claim 1, wherein the bracket is made of plastic.

7. The portable electronic device of claim 6, wherein the bracket is made of thermoplastic polyurethanes.

8. The portable electronic device of claim 1, wherein the holding member and the connecting member are integrally formed.

9. A portable electronic device, comprising:
   a cover comprising an upper shell;
   a main body rotatably connecting to the cover; and
   a bracket comprising a holding member for holding lens and a buffer connecting to the holding member, the holding member defining a holding slot, the holding slot having an inner sidewall, the inner sidewall forming at least one protrusion; and
   at least one restricting portion protruding from the edge of the upper shell;
   wherein the surface of the buffer is coated with conductive material, part of the buffer is positioned between the cover and the main body, reducing abrasion of the cover and the main body, the buffer defines at least one restricting hole receiving the at least one restricting portion.

10. The portable electronic device of claim 9, wherein the cover further comprises a lower shell engaging with the upper shell; the holding member and part of the buffer are received between the upper shell and the lower shell.

11. The portable electronic device of claim 10, wherein the holding member and the buffer are integrally formed.

12. The portable electronic device of claim 9, wherein the bracket is made of plastic.

13. The portable electronic device of claim 12, wherein the bracket is made of thermoplastic polyurethanes.

* * * * *